US008108765B2

(12) United States Patent
Lim et al.

(10) Patent No.: US 8,108,765 B2
(45) Date of Patent: Jan. 31, 2012

(54) IDENTIFYING AND ANNOTATING SHARED HIERARCHICAL MARKUP DOCUMENT TREES

(75) Inventors: Lipyeow Lim, North White Plains, NY (US); Haixun Wang, Irvington, NY (US); Min Wang, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 11/548,325

(22) Filed: Oct. 11, 2006

(65) Prior Publication Data
US 2008/0092034 A1 Apr. 17, 2008

(51) Int. Cl.
*G06F 17/00* (2006.01)
(52) U.S. Cl. ......... 715/234; 715/229; 715/209; 715/255
(58) Field of Classification Search .................. 715/229, 715/239, 242, 255, 234, 209
See application file for complete search history.

(56) References Cited

U.S. PATENT DOCUMENTS

| | | | |
|---|---|---|---|
| 6,848,078 B1* | 1/2005 | Birsan et al. .................. 715/206 |
| 7,398,265 B2* | 7/2008 | Thusoo et al. ..................... 707/2 |
| 7,512,615 B2* | 3/2009 | Bordawekar et al. ......... 707/101 |
| 7,536,711 B2* | 5/2009 | Miyashita et al. ................. 726/3 |
| 2002/0019837 A1* | 2/2002 | Balnaves ....................... 707/512 |
| 2003/0163285 A1* | 8/2003 | Nakamura et al. ............. 702/179 |
| 2003/0237047 A1 | 12/2003 | Borson |
| 2004/0143581 A1* | 7/2004 | Bohannon et al. ............. 707/100 |
| 2004/0260676 A1 | 12/2004 | Douglis et al. |
| 2005/0149552 A1* | 7/2005 | Chan et al. .................... 707/102 |
| 2005/0203957 A1* | 9/2005 | Wang et al. ................. 707/104.1 |
| 2006/0036631 A1* | 2/2006 | Cheslow ....................... 707/101 |
| 2006/0041579 A1* | 2/2006 | Miyashita et al. ............ 707/102 |
| 2006/0059184 A1* | 3/2006 | Narsude ........................ 707/101 |
| 2007/0168327 A1 | 7/2007 | Lindblad et al. |
| 2007/0219976 A1* | 9/2007 | Muralidhar et al. .............. 707/4 |
| 2008/0091649 A1 | 4/2008 | Lim |

OTHER PUBLICATIONS

Chien et al., "XML document versioning", ACM SIGMOD Record archive, Sep. 2001, ACM, vol. 30 , Issue 3, pp. 46-53.*
Chien et al., "Supporting complex queries on multiversion XML documents", ACM Transactions on Internet Technology, ACM, Vo. 6, No. 1, pp. 53-84, Feb. 2006.*
Qeli et al. "Customizable detection of changes for XML documents using XPath expressions", ACM 2006.*
"MAN page for UNIX command 'comm'", 2003, http://web.archive.org/web/20030404074455/http://www.ss64.com/bash/comm.html.*
Kyriakos Komvoteas, "XML Diff and Patch Tool" , 2003, http://web.archive.org/web/20041124222548/http://treepatch.sourceforge.net/report.pdf.*

(Continued)

*Primary Examiner* — Thu Huynh
(74) *Attorney, Agent, or Firm* — Jon A. Gibbons; Fleit Gibbons Gutman Bongini & Bianco PL (57) ABSTRACT

Disclosed are a method, information processing system, and a computer readable medium for managing documents. The method includes analyzing a plurality of hierarchical markup documents, wherein each hierarchical markup document is representable by a hierarchical tree structure. A shared hierarchical markup document associated with the plurality of hierarchical markup documents is generated based on the analyzing. Each hierarchical markup document in the plurality of hierarchical markup documents is compared with the shared hierarchical document. A plurality of difference hierarchical markup documents is generated based on the comparing.

16 Claims, 8 Drawing Sheets

OTHER PUBLICATIONS

Raihan Al-Ekram, Archana Adma, and Olga Baysal.diffX: an algorithm to detect changes in multi-version XML documents. In Proceedings of the 2005 conference of the Centre for Advanced Studies on Collaborative research (CASCON '05), 2005. IBM Press 1-11.*

Liefke, H., et al., "XMill: an Efficient Compressor for XML Data," In Chen, W., Naughton, J.F., Bernstein, P.A., eds.: SIGMOD. (2000).

Tolani, P., et al., "XGRIND: A Query-friendly XML Compressor," In: ICDE. (2002).

Wang, Y., et al., "X-Diff: An Effective change Detection Algorithm for XML Documents," In: ICDE. (2003), pp. 1-12.

Nicola, M., et al., "Native XML Support in DB2 Universal Database," In: VLDB. (2005), pp. 1164-1174.

Lim, Lipyeow, Non-Final Office Action mailed Apr. 1, 2009, U.S. Appl. No. 11/548,321, filed Oct. 11, 2006.

Lim, Lipyeow, Final Office Action mailed Nov. 12, 2009, U.S. Appl. No. 11/548,321, filed Oct. 11, 2006.

* cited by examiner

302:
```
<productinfo>
<id>1</id>
<name>NY T-shirt</name>
<size>XL</size>
<color>Blue</color>
<style>Round-neck</style>
<listprice>20.00</listprice>
<material>Cotton</material>
<description>
<italic>I love NY</italic>
printed on the front
</description>
<supplier ID-19>
<name>Bob's Garment<name>
</supplier>
</productinfo>
```

304:
```
<productinfo>
<id>2</id>
<name>
California T-shirt
</name>
<size>XL</size>
<color>Blue</color>
<style>Round-neck</style>
<listprice>30.00</listprice>
<material>Cotton</material>
<description>
<italic>I love CA</italic>
printed on the back
</description>
<supplier ID-19>
<name>Bob's Garment<name>
</supplier>
</productinfo>
```

IDENTIFYING AND ANNOTATING SHARED HIERARCHICAL MARKUP DOCUMENT TREES

CROSS REFERENCE TO RELATED APPLICATION

This application is related to the inventors' application "PROCESSING QUERIES ON HIERARCHICAL MARKUP DATA USING SHARED HIERARCHICAL MARKUP TREES", Ser. No. 11/548,321, which was filed on the same day as the present application and commonly assigned herewith to International Business Machines Corporation. This related application is incorporated herein by reference in its entirety.

FIELD OF THE INVENTION

The present invention generally relates to the field of data and query processing, and more particularly relates to managing hierarchical markup documents.

BACKGROUND OF THE INVENTION

There are two types of data, structured and unstructured. On the one hand, decades of efforts have been devoted to make database management systems ("DBMSs") more and more powerful to manage structured data; on the other hand, most of the data in business as well as science are unstructured or semi-structured. The biggest challenge in managing semi-structured data is the schema variability across the data. Several strategies for managing data with schema variability using relational DBMSs have been proposed. These include the binary schema and the vertical schema.

In recent years, a constant push from the application domain has been observed to make it easier for users to move between the two data types, For many applications such as e-commerce that depend heavily on semi-structured data such as extensible markup language ("XML") data, the relational model, with its rigid schema requirements remains ill-suited for storing and processing the highly flexible semi-structured data efficiently. Therefore, the relational model fails to support applications dependent upon semi-structured data in an effective way.

The flexibility of the XML data model, on the other hand, appears to be a good match for the required schema flexibility. However, the flexibility of XML in modeling semi-structured data usually comes with a big cost in terms of storage and query processing overhead, which to a large extent has impeded the deployment of pure XML databases to handle such data. It is clear that pure relational and pure XML approaches represent two extremes, and cannot support applications that deal with real data perfectly.

Therefore a need exists to overcome the problems with the prior art as discussed above.

SUMMARY OF THE INVENTION

Briefly, in accordance with the present invention, disclosed are a method, information processing stream, and computer readable medium for managing documents. The method includes analyzing a plurality of hierarchical markup documents, wherein each hierarchical markup document is representable by a hierarchical tree structure. A shared hierarchical markup document associated with the plurality of hierarchical markup documents is generated based on the analyzing. Each hierarchical markup document in the plurality of hierarchical markup documents is compared with the shared hierarchical document. A plurality of difference hierarchical markup documents is generated based on the comparing.

In another embodiment an information processing system for managing documents is disclosed. The information processing system comprises a memory and a processor that is communicatively coupled to the memory. A data modeler that is communicatively coupled to the processor analyzes a plurality of hierarchical markup documents, wherein each hierarchical markup document is representable by a hierarchical tree structure. A shared hierarchical markup document associated with the plurality of hierarchical markup documents is generated based on the analyzing. Each hierarchical markup document in the plurality of hierarchical markup documents is compared with the shared hierarchical document. A plurality of difference hierarchical markup documents is generated based on the comparing.

In yet another embodiment, a computer readable medium for managing documents is disclosed. The computer readable medium comprises instructions for analyzing a plurality of hierarchical markup documents, wherein each hierarchical markup document is representable by a hierarchical tree structure. A shared hierarchical markup document associated with the plurality of hierarchical markup documents is generated based on the analyzing. Each hierarchical markup document in the plurality of hierarchical markup documents is compared with the shared hierarchical document. A plurality of difference hierarchical markup documents is generated based on the comparing.

One advantage of the present invention is that structural as well as value similarities among a set of semi-structured documents are identified. The present invention creates models from the structural and value similarities that allows for efficient storage and query processing of the data within the semi-structured documents. In other words, the present invention allows for efficient managing of data with high schema variability.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Distributed Processing System

Figure 1:
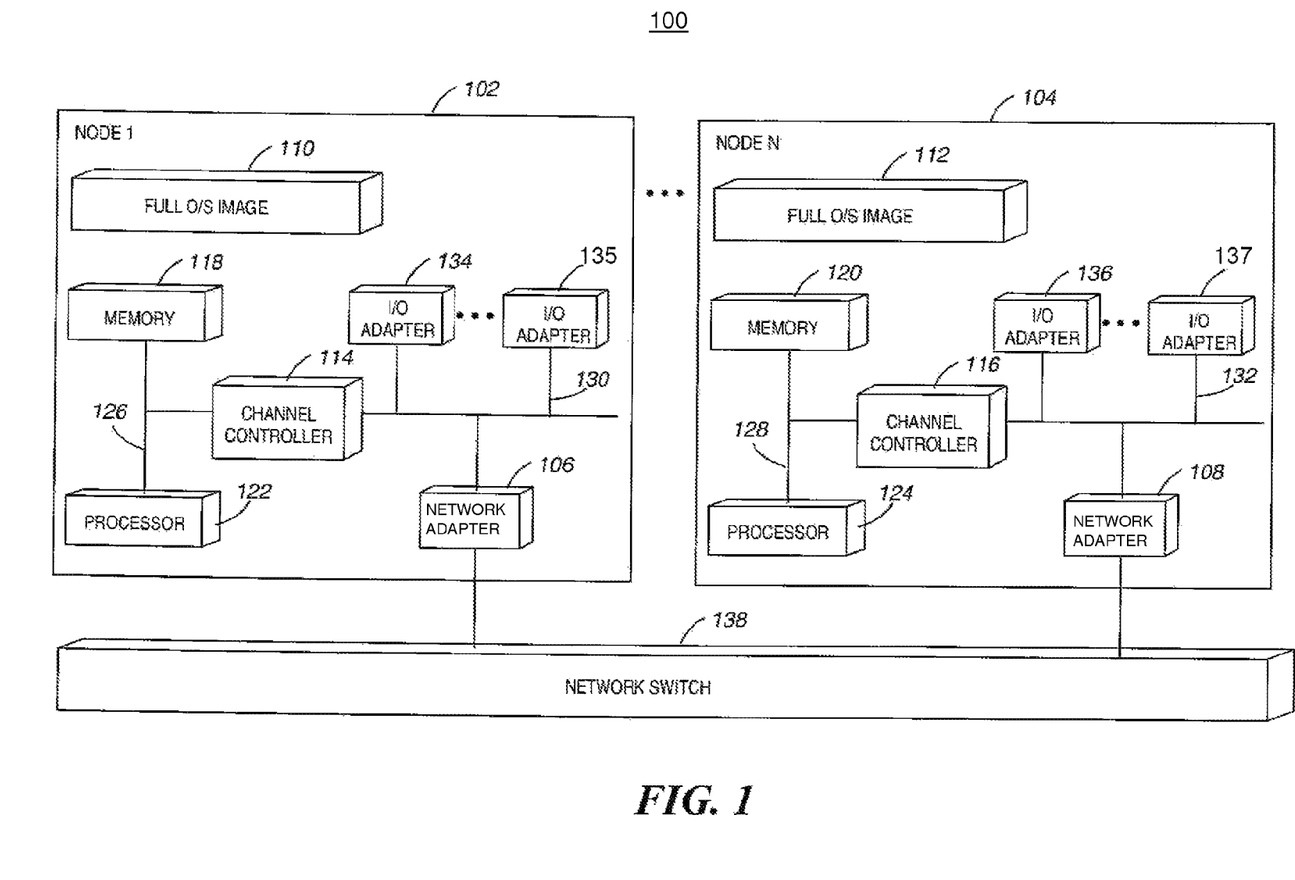
FIG. 1 is a block diagram illustrating a distributed processing system according to an embodiment of the present invention.

According to an embodiment of the present invention, as shown in FIG. 1, an exemplary distributed processing system 100 is shown. In one embodiment, the distributed processing system 100 can operate in an SMP computing environment. The distributed processing system 100 executes on a plurality of processing nodes 102, 104 coupled to one another node via a plurality of network adapters 106, 108. Each processing node 102, 104 is an independent computer with its own operating system image 110, 112, channel controller 114, 116, memory 118, 120, and processor(s) 122, 124 on a system memory bus 126, 128, a system input/output bus 130, 132 couples I/O adapters 134, 135, 136, 137 and network adapter 106, 108. Although only one processor 122, 124 is shown in each processing node 102, 104, each processing node 102, 104 is capable of having more than one processor. Each network adapter is linked together via a network switch 138. In some embodiments, the various processing nodes 102, 104 are able to be part of a processing cluster. All of these variations are considered a part of the claimed invention. It should be noted that the present invention is also applicable to a single information processing system.

Information Processing System

Figure 2:
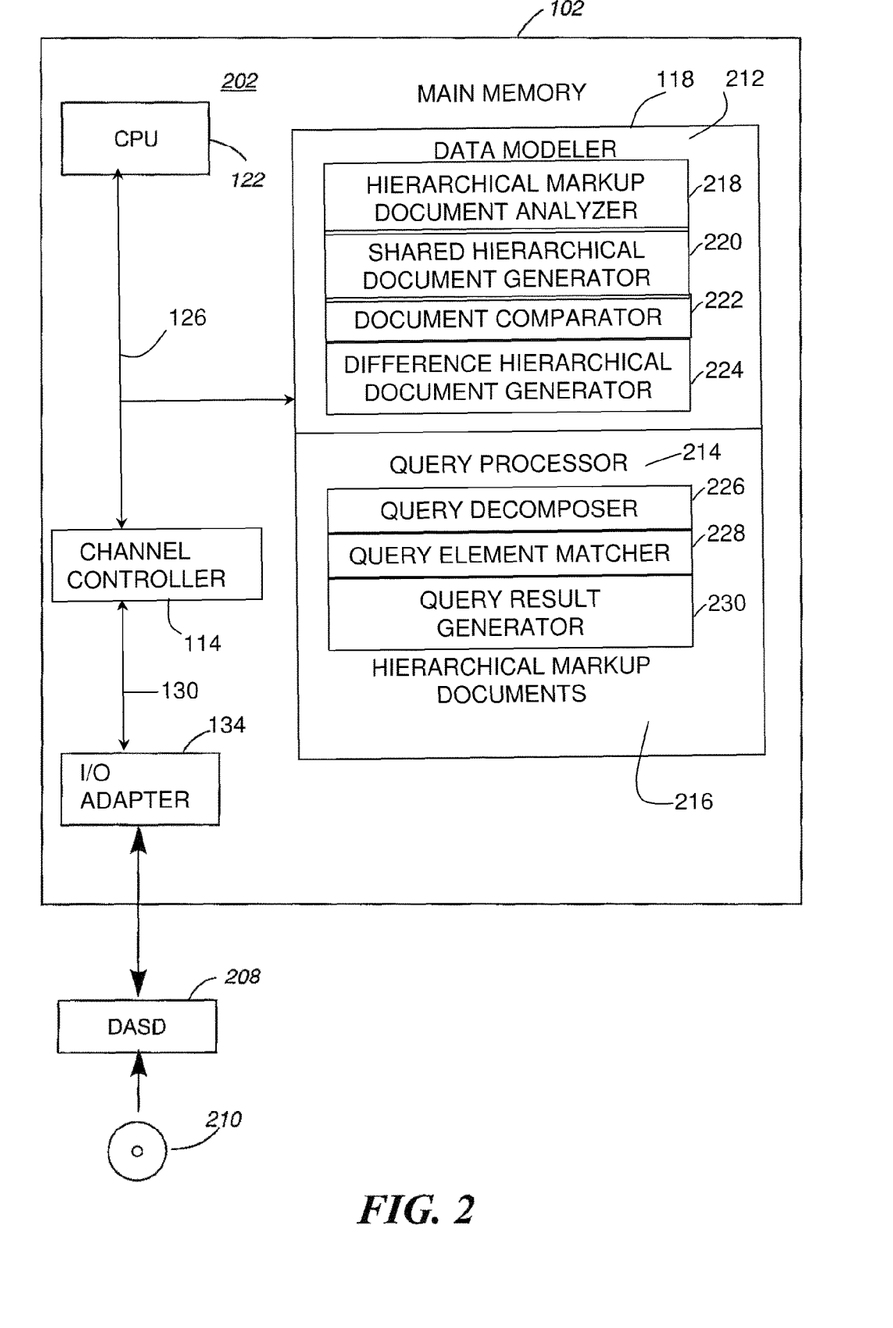
FIG. 2 is a more detailed view of the processing nodes of FIG. 2 according to the present invention.

FIG. 2 is a block diagram illustrating a more detailed view of the processing node 102 of FIG. 1, which from hereon in is referred to as information processing system 102. The information processing system 102 is based upon a suitably configured processing system adapted to implement the exemplary embodiment of the present invention. Any suitably configured processing system is similarly able to be used as the information processing system 102 by embodiments of the present invention, for example, a personal computer, workstation, or the like. The information processing system 102 includes a computer 202. The computer 202 includes a processor 122, main memory 118, and a channel controller 114 on a system bus. A system input/output bus 130 couples an I/O adapter 134. The I/O adapter 134 is used to connect mass storage devices such as data storage device 208 to the information processing system 102. One specific type of data storage device is a computer readable medium such as a CD drive or DVD drive, which may be used to store data to and read data from a CD 210 (or DVD). Another type of data storage device is a data storage device configured to support, for example, NTFS type file system operations.

The main memory 118, in one embodiment, includes a data modeler 212, a query processor 214, and hierarchical markup documents 216, It should be noted that the hierarchical markup documents are not limited to residing within the main memory 118. For example, the hierarchical markup documents 216 can reside on a remote server or database. In one embodiment, the hierarchical markup documents are extensible markup language ("XML") documents. However, the present invention is applicable to any hierarchical markup document that can be represented by a hierarchical tree structure.

The data modeler 212 and the query processor 214 allow for efficient storage and query processing of semi-structured data. As stated above, pure relational and pure XML database management approaches represent two extremes which cannot support applications that deal with semi-structured data. The present invention provides a solution that lies between the two extremes by exploring characteristics of the data. The similarities of a set of semi-structured data can be significant for objects that belong to the same category. For example, many e-businesses provide electronic product catalogs ("e-catalog") that allow buyers, sellers, and brokers to search products of interest. These e-catalogs can include tens of thousands of products, and each product can have its own set of attributes. For example, a "T-shirt" product in a woman's shirt category may be associated with the attribute set {size, style, color, price}. A "TV set" in an electronics category may have a quite different attribute set such as {brand, view_type, signal type, screen_size, price}. It is likely that the structural similarity between two different T-shirts or two different TV sets are significant.

DBMSs that include native XML support can support columns of a relational table that can have XML type. This means a tuple can have XML documents as its column value. These XML documents can be queried, in one embodiment, using embedded XPath expressions in SQL, as is further discussed in "Native XML Support in DB2 Universal Database" VLDB. (2005) 1164-1174, Nicola, M., der Linden, B. V, which is hereby incorporated by reference in its entirety. E-catalog data can be stored in a table with the following schema: ecatalog (productID Int, categoryID Int, info XML). More specifically, a product is identified by its productID and its categoryID and the info field stores its detailed information in XML form. As in the case of T-shirts and TV sets, products in the same category usually exhibit substantial structural and value similarity. The example of an e-catalog is used through this discussion only as an example.

The data modeler 212, in one embodiment, takes as input original hierarchical markup documents 216. The data modeler 212 extricates a shared hierarchical markup document (a model) and stores the original documents 216 as differences from the shared hierarchical markup document. The data modeler 212 then generates a view of the decomposed data that has the same schema as the original data. In one embodiment, the shared hierarchical markup document is a collection of similar hierarchical documents. Each original hierarchical markup document 216, in one embodiment, is associated with a difference document. An example of a shared hierarchical and difference hierarchical markup document is given further below.

In one embodiment, the data modeler 212 includes a hierarchical markup document analyzer 218 for determining the characteristics of a hierarchical markup document 216. The determined characteristics can be used by a shared hierarchical markup document generator 220 also included in the data modeler 212 for generating shared documents. For example, the hierarchical markup document analyzer 218 determines the similar structures and values of the hierarchical markup documents 216 for use in generating a shared document.

A hierarchical markup document 216 comprises a hierarchical tree structure. One of the goals of the shared hierarchical markup document generator 220 is to determine the largest shared tree (the tree with the most nodes). For unordered trees, the problem is NP-hard, but polynomial time. In other words, one goal is to find a single rooted tree that is common to a collection of hierarchical markup document trees such as XML trees. One difficulty in finding a single shared tree among a set of hierarchical markup trees is that a set of unordered children nodes may have the same node name. For example, take two XML documents each with a child node B occurring under a parent node A. The largest shared document is not unique for these two documents. One alternative includes all nodes except for node C and the other all nodes except for node D. To find the largest shared document among a set of documents, the shared hierarchical markup document generator 220, in one embodiment, stores all such alternatives at every step, which makes the complexity of the entire procedure exponential.

In one embodiment, a greedy approach is used for generating a shared document. The shared hierarchical markup document generator 220, in one embodiment, generates the shared document of two documents, by starting from their root nodes. Let $n_1$ and $n_2$ be the root nodes of two hierarchical markup documents. The shared hierarchical markup document generator 220 determines that two nodes match if they have the same node type, and either they have same names (for element/attribute nodes) or they have the same values (for value nodes). If $n_1$ and $n_2$ do not match, then the shared document is determined to be an empty document. Otherwise, the shared hierarchical markup document generator 220 recursively finds matches for each of their child nodes.

Special consideration is given to the case where several child nodes have the same name and the child nodes are unordered. For example, assume $C_1(l)=\{s_{1l}, \ldots, s_{1m}\}$ and $C_2(l)=\{s_{2l}, \ldots, s_{2n}\}$ are two sets of child nodes with the same name that are needed to be matched. The shared hierarchical markup document generator 220 recursively generates the shared hierarchical markup sub-tree for every pair $(s_{1i}, s_{2j})$ of the instances. Out of the m×n shared hierarchical markup trees, the shared hierarchical markup document generator 220 chooses the sub-tree $r_{pq}$ with the largest size and add $r_{pq}$ as the child node of the current shared hierarchical markup tree r. The shared hierarchical markup document generator 220 removes all the shared trees associated with either $s_{1p}$ or $s_{2q}$ from the candidate set M so that they will not be chosen anymore. Then, the shared hierarchical markup document generator 220 finds the next largest hierarchical markup tree in the remaining (m−1)(n−1) candidate shared hierarchical markup sub-trees. This process is repeated until no shared sub-trees can be found.

Algorithm 1 below outlines the process for finding a shared document between two hierarchical markup documents. Based on the algorithm 1 process, algorithm 2 finds the shared document among a set of hierarchical markup documents.

Algorithm 1: Finding the shared XML subtree between two unordered XML trees.

Function match Tree($n_1, n_2$)
Input: $n_1, n_2$: root node of the two XML tree
Output: r: a shared subtree
if $n_1$ matches $n_2$ then
| r ← new node
|  copy $n_1$ to r
let $C_1$ = {child nodes of $n_1$}
let $C_2$ = {child nodes of $n_2$}
let L = { node names common to $C_1$ and $C_2$}
for each node name l ∈ L do
| let $C_1(l)$ = {nodes from $C_1$ with name l} = $\{s_{11},...,s_{1m}\}$
| let $C_2(l)$ = {nodes from $C_2$ with name l} = $\{s_{21},...,s_{2n}\}$
| for each $(s_{1i}, s_{2j}) \in C_1(l) \times C_2(l)$ do
| |  $r_{ij}$ ← matchTree($s_{1i}, s_{2j}$)
| Let M = $\{r_{ij} : \forall i, j\}$
| while M ≠ ∅ do
| | $r_{pq}$ ← arg max$_{r_{ij} \in M}$ SizeOf( $r_{ij}$ )
| | add $r_{pq}$ as a child node of r
| |  remove $r_{pk}$ and $r_{kq}$ from M, ∀k
|
return r Algorithm 2: Finding the shared XML document in a set of XML documents.

Input: D: a set of XML documents (represented by their root nodes)
Output: r: a shared XML document
Assume D = $\{d_1, d_2, ..., d_n\}$
s ← $d_1$
for each document d ∈ D do
|  s ← matchTree(s, d)

In one embodiment, the shared hierarchical markup document generator 220 can also use hierarchical markup schemata when determining a shared document. For example, schemata provides useful information that can be exploited. If the schema specifies a fixed tree structure that all the documents must conform to, the shared hierarchical markup document generator 220 starts with that given structure as the shared hierarchical markup tree and find common values among the set of documents. In the case that the schema is very flexible and does not specify a fixed structure, type information can help determine if a set of child nodes are ordered or unordered. In the unordered case, algorithm 1 above can be used, and in the ordered case, matching is trivial.

The data modeler 212, in one embodiment, also includes a document comparator 222 that in conjunction with a difference hierarchical markup document generator 224 generates difference documents associated with each original hierarchical markup document 216. The difference hierarchical markup document generator 224 computes the difference between each document in the original collection of hierarchical markup documents 216 and the shared hierarchical markup document. In one embodiment, the differences between an original hierarchical markup document 216 and the shared hierarchical markup document is modeled as a set of sub-tree insertions. A sub-tree, in one embodiment, can be a single value. Each insertion is represented using a hierarchical markup fragment comprising of a node specifying a node identifier. The node identifier uniquely identifies the insertion point in the shared hierarchical markup tree. The subtree rooted at that node is the subtree to be inserted. The fragments for all the insertions associated with a single original hierarchical markup document 216 are then collected under root node <diff>, forming the hierarchical markup representation for the difference document. An example of a difference document is given further below. In another embodiment, a difference hierarchical document can include deletions as well.

Figure 4:
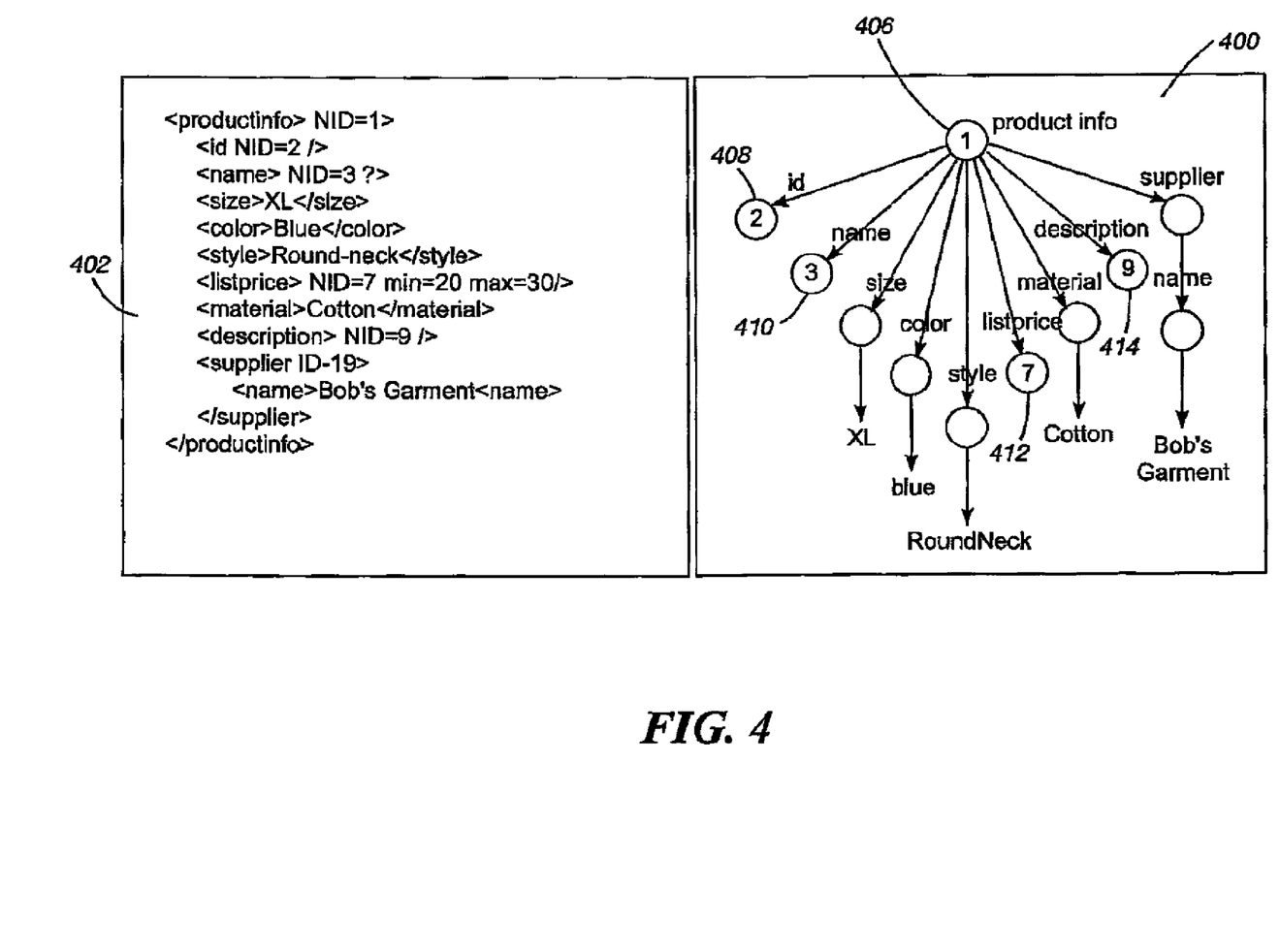
FIG. 4 is an exemplary shared hierarchical markup document according to an embodiment the present invention.

In another embodiment, the data modeler 212 also annotates the shared hierarchical markup document 400. The shared hierarchical markup document 400, in one embodiment, can be annotated with a node identifier and/or a value notation. Node identifiers can be used by the difference representation to specify insertion locations. In one embodiment, node identifiers can by implicitly maintained by a DBM or explicitly annotated as attributes in the shared hierarchical markup tree. Also, the shared hierarchical markup tree can be optionally annotated with statistics including values such as maximum and minimum values associated with the nodes. This type of annotation facilitates efficient query processing. In one embodiment, these value annotations are collected while scanning the documents for computing the difference documents and added after the difference documents are processed.

Figure 5:
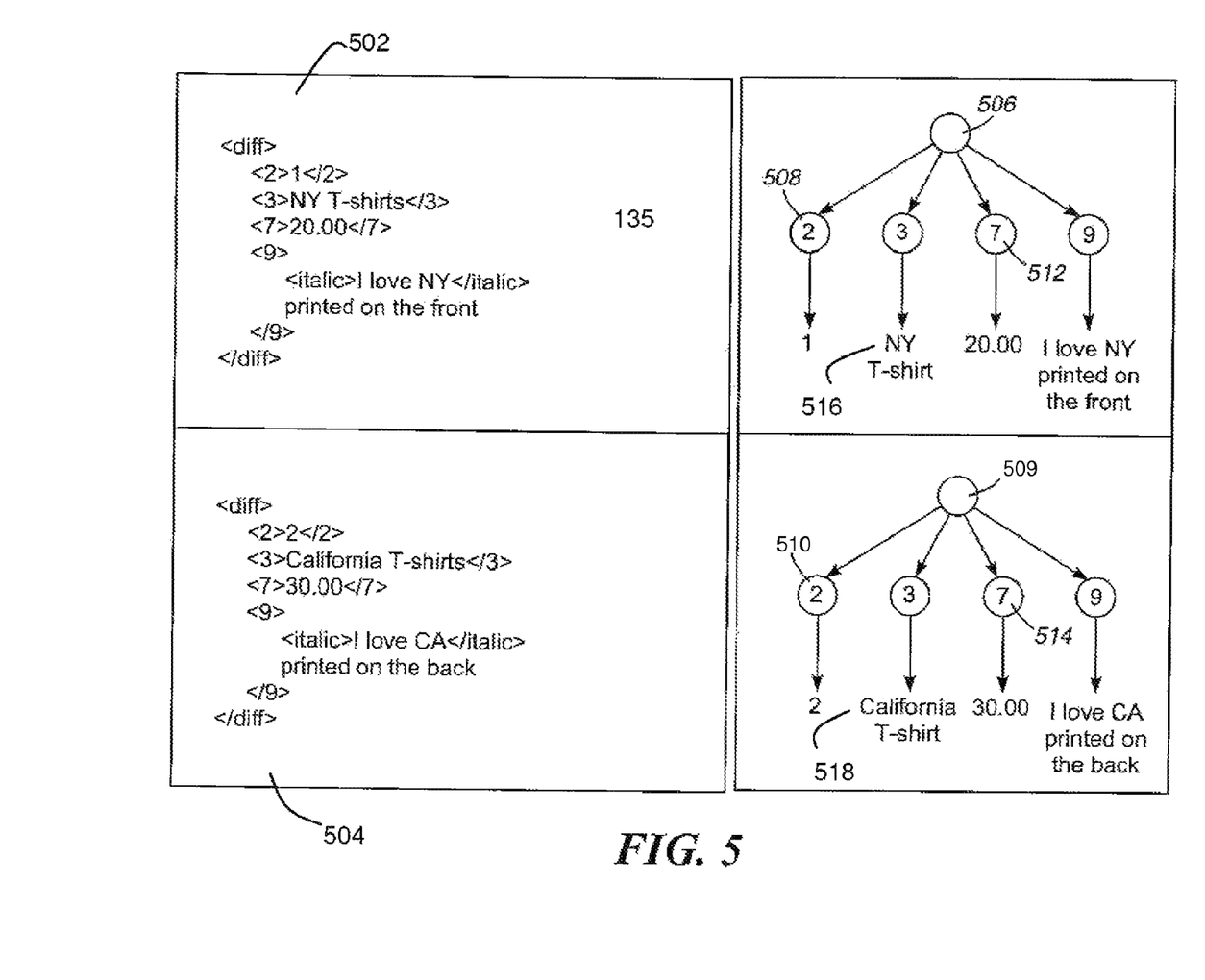
FIG. 5 illustrates two exemplary difference hierarchical markup documents according to an embodiment of the present invention.

As discussed above, the main memory 118 also includes a query processor 214. The query processor 214 receives a query for the original hierarchical markup documents 216 and transforms the query into a new query that can process the shared hierarchical markup document 400 and difference documents 502, 504. The query processor 214, in one embodiment, includes a query decomposer 226 that decomposes the expressions of a query. In one embodiment a query comprises XPath expressions, however, a query can include other expressions as well. The query decomposer 226 breaks the query expression into a first part that is processed using the shared hierarchical markup document 400 and into a second part that is processed using the difference hierarchical markup documents 502, 504.

A query element matcher 228 processes each query path expression against the shared hierarchal markup document and the difference documents. For example, each query path expression is first processed against the set of shared hierarchical markup document. The query element matcher 228 determines if the query path has been completely matched. If this is true, all the documents associated with the shared hierarchical markup document satisfy the query path expression and are retrieved by a query result generator 230. If only a partial match exists, the query path expression is processed against each difference hierarchical markup document associated with the shared document. After all of the query expression paths have been processed the matching documents are retrieved and the query result generator 230 generates a final query result. An example of the query expression path matching processing is given further below.

Although only one CPU 122 is illustrated for computer 202, computer systems with multiple CPUs can be used equally effectively. Embodiments of the present invention further incorporate interfaces that each includes separate, fully programmed microprocessors that are used to off-load processing from the CPU 122.

An operating system image 110 included in the main memory 118 is a suitable multitasking operating system such as the Linux, UNIX, WINDOWS XP, and WINDOWS SERVER 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 106. The network adapter hardware 106 is used to provide an interface to a network 234 such as a wireless network, WLAN, LAN, or the like. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via a CD/DVD, e.g. CD 210, or other form of recordable media, or via any type of electronic transmission mechanism.

Shared Hierarchical Markup Document

Figure 3:
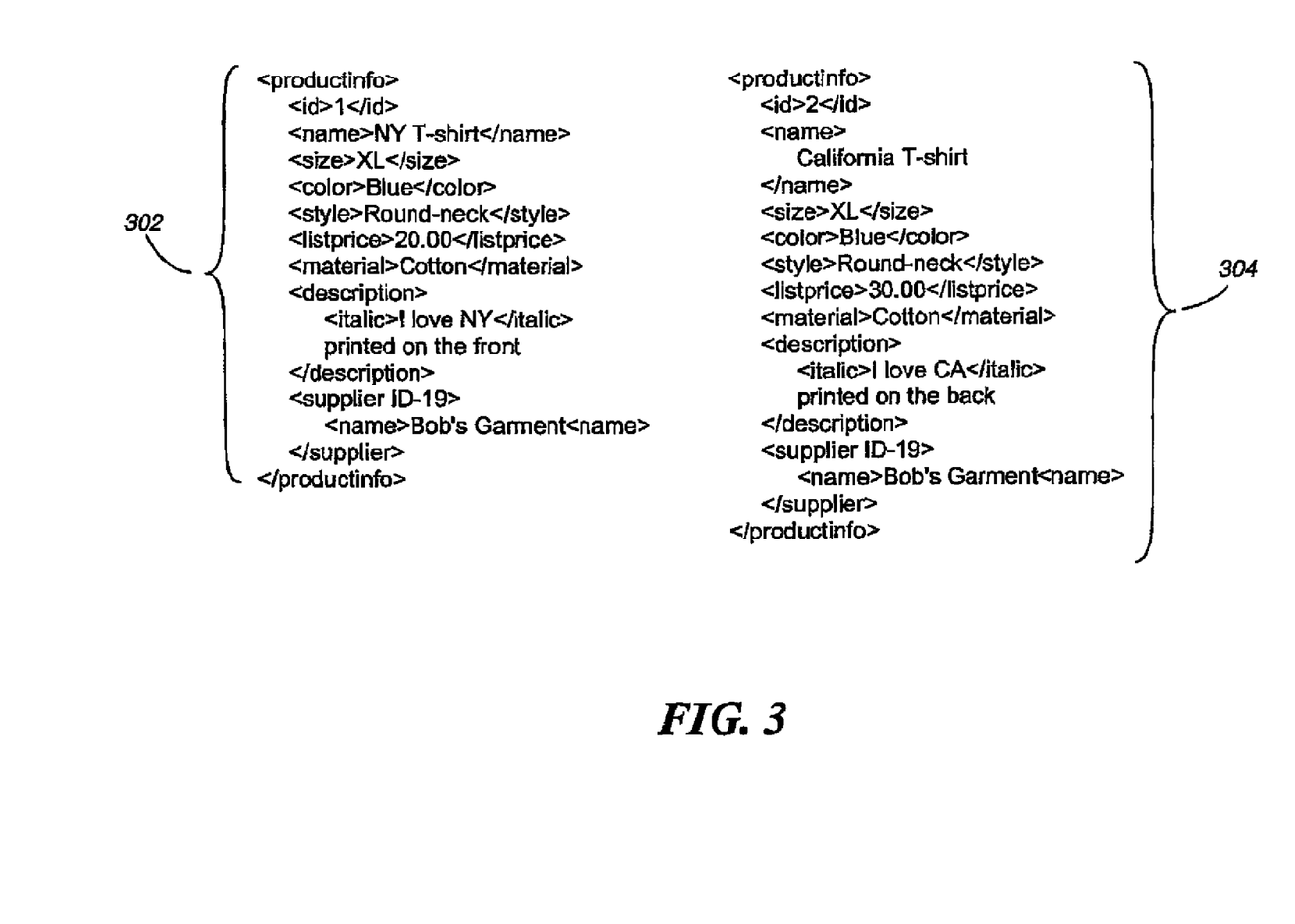
FIG. 3 illustrates two examples of hierarchical markup documents according to the present invention.

FIG. 3 includes two exemplary XML documents 302, 304 of two T-shirt products and FIG. 4 is an exemplary shared XML document generated from the two XML documents of FIG. 3. As can be seen from FIG. 3, the two XML documents 302, 304 the two T-shirts differ in name, description, and price. However, the structure of the XML documents 302, 304 and certain attributes such as size and color are the same. As discussed above, the shared hierarchical markup document generator 220 determines a shared document from the two XML documents 302, 304. It should be noted that the present invention is not limited to finding a shared document between two original documents. A shared document can also be determined from three or more hierarchical markup documents.

Based on the analysis of the two XML documents 302, 304, the shared hierarchical markup document generator 220 generates the shared document 400 shown in FIG. 4. As can be seen from FIG. 4, the shared document 400 is a single connected tree that includes values in addition to structure. The XML representation 402 of the shared document 400 is also shown in FIG. 4. The shared document is represented by a tree structure including a parent node 406 and children nodes such as nodes 408, 410, 412, and 414. The children nodes 408, 410, 412, 414 include node identifiers (i.e. 2, 3, 7, 9) that identify even though the two XML documents 302, 304 include these categories, their content differ.

One advantage of the present invention is storage efficiency. Information common to all product documents within a category is extricated and stored once in the shared document 400 instead of being redundantly stored in every document. The decomposition performed by the present invention is done in a query friendly way that ensures queries on the original table can be mapped to queries on the decomposed tables. This allows for the queries to be processed efficiently thereafter.

Difference Hierarchical Markup Documents

Once the shared document is created, difference documents for each original document are created. FIG. 5 shows two difference documents 502, 504 associated with the two XML documents 302, 304, respectively, of FIG. 3. The difference documents 502, 504 include a parent node 506, 509 and children nodes 508, 512, 510, 514. The children nodes 508, 510, 512, 514 include node identifiers that correspond to a node in the shared document 400. The children nodes 508, 510, 512, 514 also include an attribute such as attributes 516, 518 that create the differences between the XML documents 302, 304 and the shared document 400. In one embodiment, each difference document 502, 504 represents a set of insertion operations onto the shared XML tree. Each of the two difference documents 502, 504 represents four insertions, as there are four child nodes under the root node 506, 508. The name of these child nodes are node identifiers. In one embodiment, by inserting each sub-tree in the difference document 502, 504 as the child of the node in the shared XML tree 400, with respect to the node identifier, the original XML documents 302, 304 can be recovered. In other words, the original hierarchical markup document such as an XML document can be reconstructed using the shared hierarchical markup document and the difference hierarchical markup documents.

Query Path Expression Processing

Figure 6:
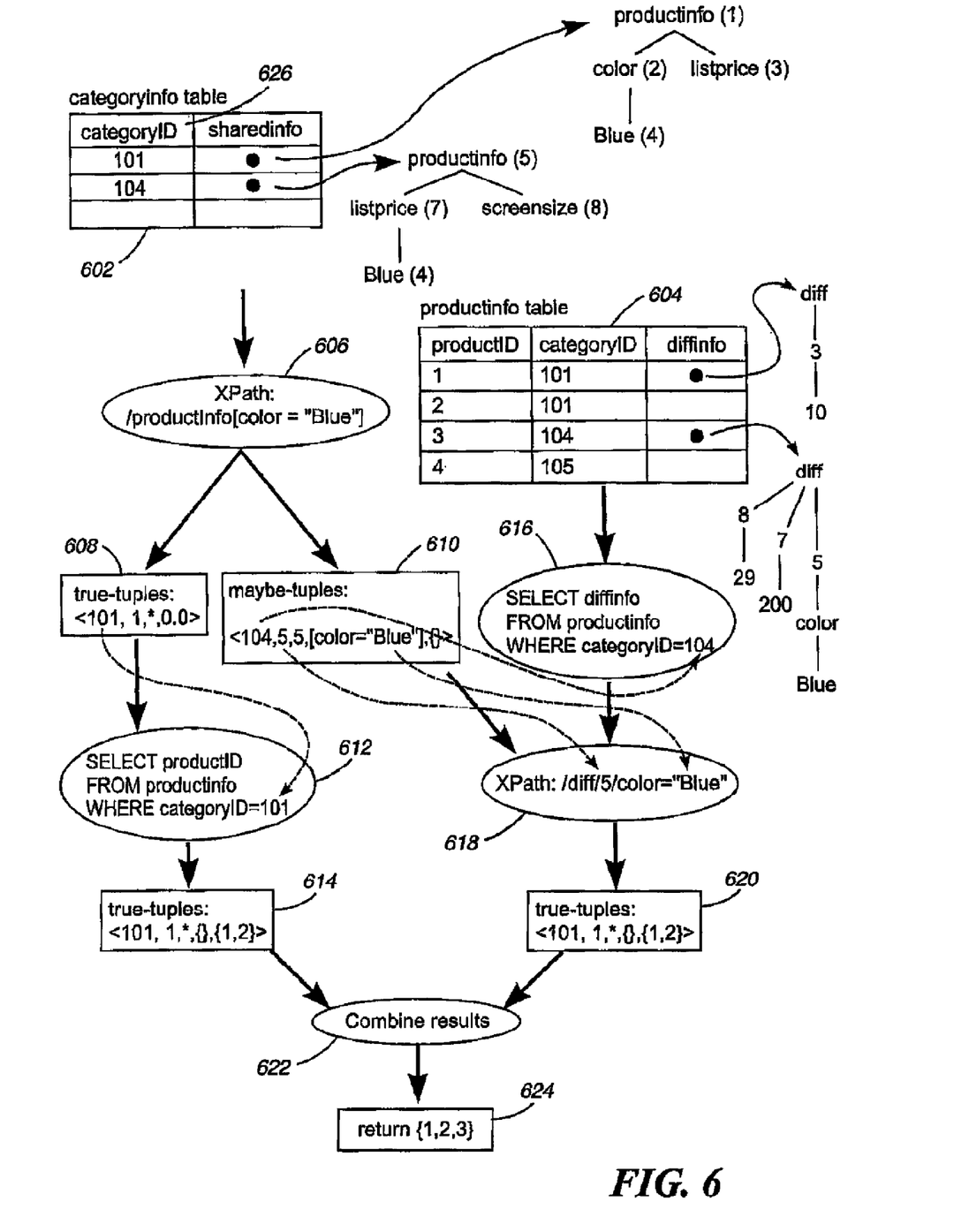
FIG. 6 illustrates an exemplary processing flow for processing a query with shared and difference hierarchical markup documents according to an embodiment of the present invention.

FIG. 6 illustrates an example of processing a query in an e-commerce application using a shared tree and difference documents. A query to be processed in FIG. 6 is for retrieving all the product identifiers of all products that are blue in color. The e-commerce application of FIG. 6 stores its product catalog information in a table with schema, Product(productID int, categoryID int, info XML). All the information associated with each product is stored in the XML document in the info column of the product table 604. CategoryID 626 denotes the category of the product, such as women's clothing, televisions etc. Assume this same information has been stored using shared trees and differences. All the documents associated with each category are decomposed into difference documents with respect to the one shared tree associated with the category. The shared tree for each category is stored in the categoryInfo table 602 and the difference document of each product is stored in the productInfo table 604. As stated above, the exemplary XPath query is for retrieving all the product identifiers of all products that are blue in color. In the SQL/XML query language, the query can be expressed as:

SELECT productID
FROM Product
WHERE XMLExists('$t/productinfo[color=blue]' passing Product.info as "t")

The process at 606 evaluates the XPath, which is an exemplary query path expression, corresponding to the query predicate on the shared documents from the category table 602. The output of 606 includes true-tuples 608 and maybe-tuples 610. The information in the true tuples 608 include the category IDs of all shared documents that complete satisfy the XPath. The information in the maybe-tuples 610 includes the category IDs of all shared documents that partially satisfy the XPath, the node IDs of the partial matches, and the remaining part of the XPath to be matched. For the true-tuples 608 from the process 606, the product IDs of the satisfying category IDs are retrieved from the productInfo table at the process 612. The output of process 612 is true-tuples 614 including information on all of the matching product IDs and could include node IDs of matching nodes. For the maybe-tuples 610 from the process 606, the difference documents associated with the category IDs (in the maybe-tuples 610) are retrieved by process 616 and the remaining XPath to be matched are evaluated on the difference documents by process 618. The output of process 618 are true-tuples (620) including information on all the matching product IDs and could include node IDs of matching nodes. The true-tuples 614 and 620 are combined by process 622 to produce the final result 624.

The above process first processes the XPath "/productinfo[color=blue]" on the shared documents in the categoryInfo table. One of the goals of this processing step is to determine which category includes (partial) matches to the XPath and which categories do not. Categories that do not include matches to the XPath can be eliminated from further processing. For categories that do include (partial) matches to the XPath, this processing step further distinguishes between two sub-classes of categories: categories whose shared tree include a complete match of the query XPath (true-tuples) and categories whose shared tree only include a partial, prefix match of the query XPath (maybe-tuples). In the first case, all of the product IDs associated with that category can be retrieved, because they satisfy the query. In the second case, the difference documents 502, 504 associated with each partial match category need to be retrieved from the productInfo table 604. For each of the partial match categories, the corresponding unmatched portion of the XPath is processed against each of the difference document 502, 504 to determine which products satisfy the query. In order to resolve the partial match, the maybe-tuples for each partial match category needs to include the node ID info of the last matching node (in the shared document 400) with respect to the XPath. This node ID is then be matched against each of the difference documents 502, 504 before further matching of the remaining XPath can be performed. The result of this step is a list of product IDs that satisfy the query as discussed above. This list of product IDs is then combined with the product IDs from those retrieved using fully matching category IDs to form the final result 624.

Exemplary Process of Decomposing a Set of Hierarchical Markup Documents

Figure 7:
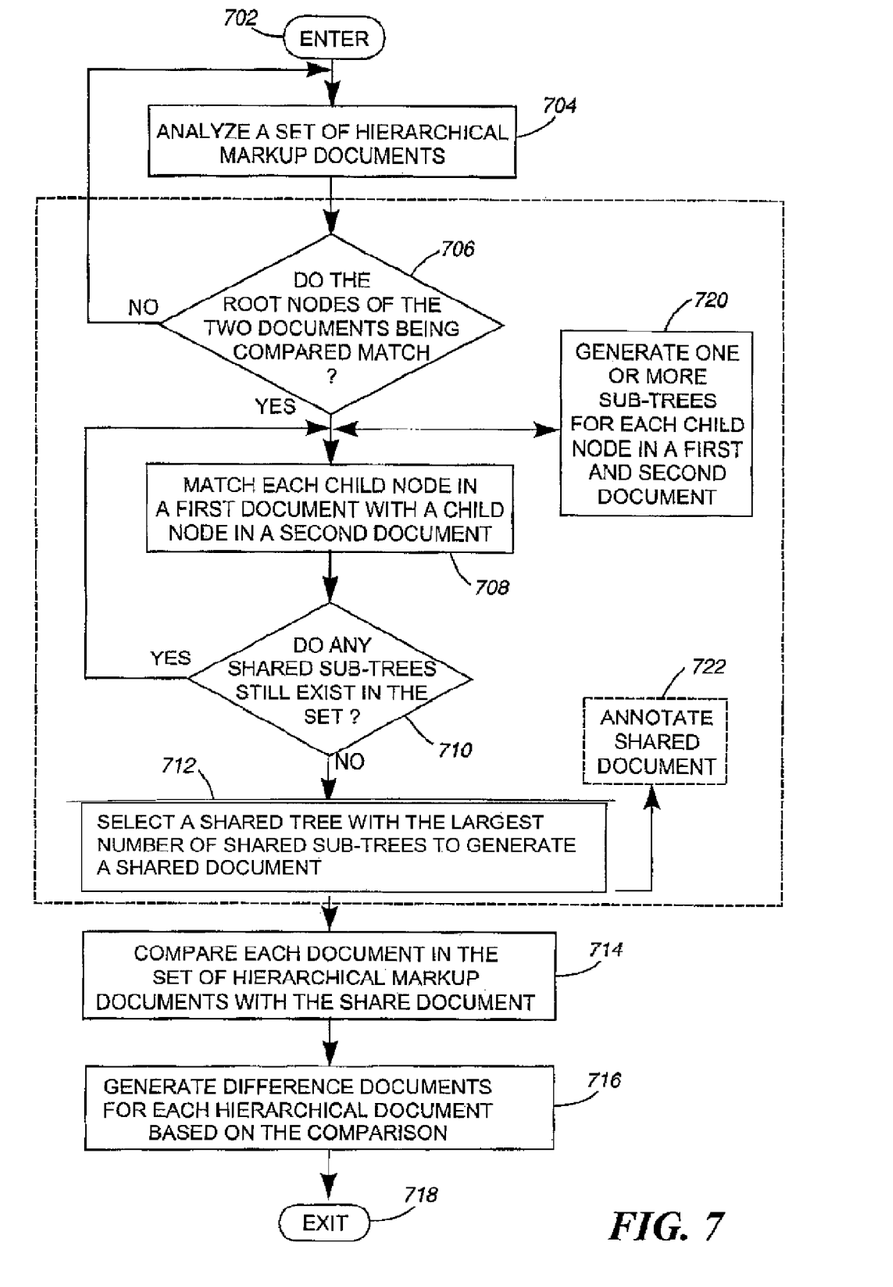
FIG. 7 is an operational flow diagram illustrating an exemplary process of generating shared and difference hierarchical markup documents according to an embodiment of the present invention.

FIG. 7 illustrates an exemplary process of generating a shared hierarchical markup document and corresponding difference documents. The operational flow diagram of FIG. 7 begins at step 702 and flows directly to step 704. The data modeler 212, at step 704, analyzes a set of hierarchical markup documents 216. Root nodes of at least two of the hierarchical markup documents 216 are compared and the data modeler 212, at step 706, determines if the root nodes match. If the result of this determination is negative, an empty shared document exists and more hierarchical documents are compared (if they exist). If the result of this determination is positive, the data modeler 212, at step 720, generates one or more sub-trees for each child node in a first and second hierarchical markup document. The data modeler 212, at step 708, matches each child node of the hierarchical documents 216 currently being compared to find matches for each of the nodes, as discussed above with respect to FIG. 2.

The data modeler 212, at step 712, selects a shared sub-trees from the one or more shared sub-trees that is largest in size and generates a shared hierarchical markup document based thereon. In other words, the shard tree having the most nodes is chosen and this becomes the shared hierarchical document for the set of hierarchical markup documents 216. The data modeler 212, at step 722, optionally annotates the shared document. For example, the shared document can be annotated with a node identifier, a value notation, and/or statistics including values such as maximum and minimum values associated with the nodes. It should be noted that steps 706, 720, 708, 710, 712, and 722 are part of the shared hierarchical markup document generating process, as shown by the dashed line 724. The data modeler 212, at step 714, compares each hierarchical markup document in the set of hierarchical markup documents 216 with the shared document. Based on the comparison, the data modeler 212, at step 716, generates difference documents for each of the hierarchical markup documents 216, as discussed above with respect to FIG. 2. The control flow then exits at step 718.

Exemplary Process of Query Processing with Shared and Difference Documents

Figure 8:
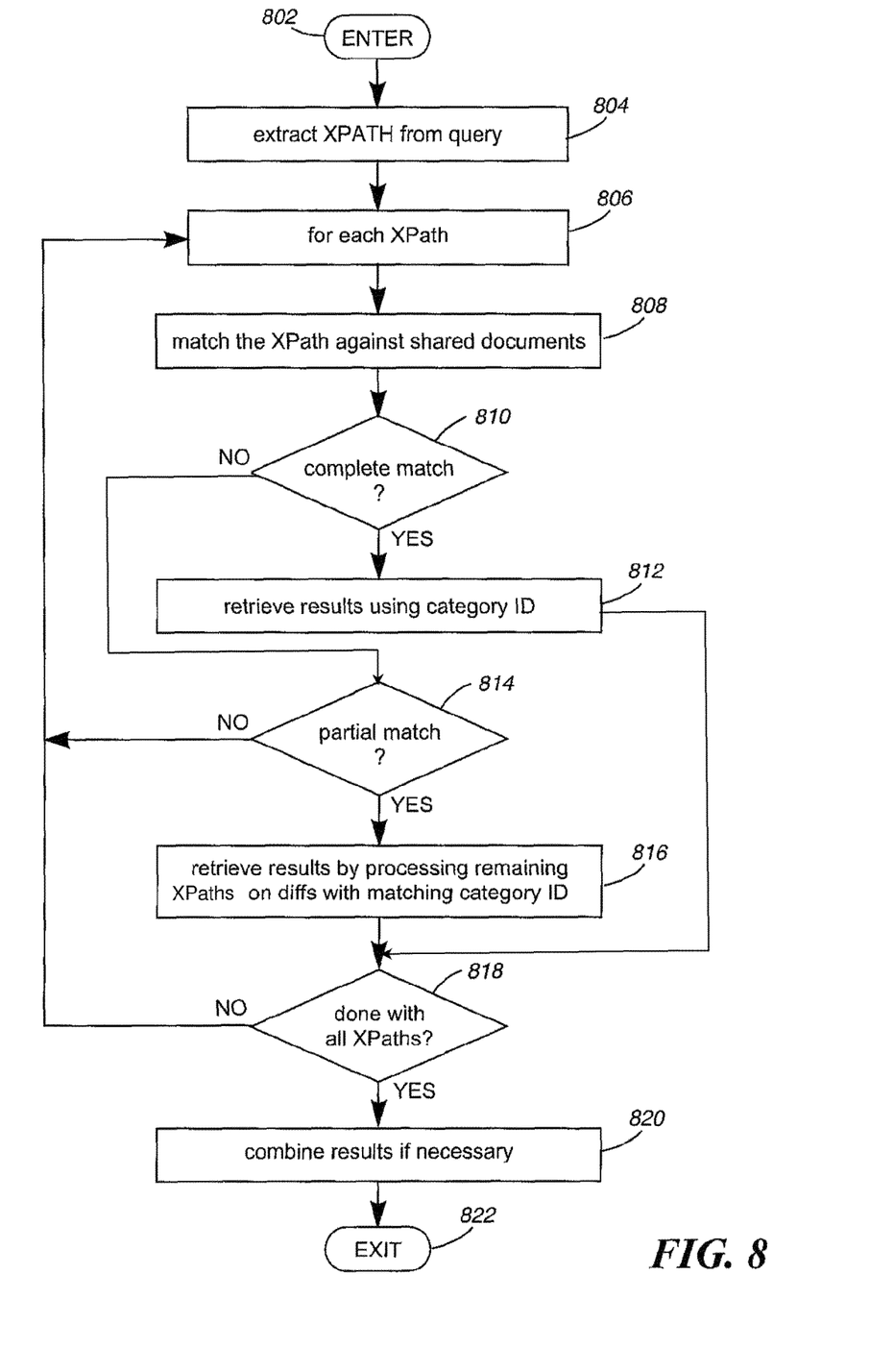
FIG. 8 is an operational flow diagram illustrating an exemplary process of processing a query with shared and difference hierarchical markup documents according to an embodiment of the present invention.

FIG. 8 illustrates an exemplary process of processing a query with shared and difference documents. The operational flow diagram of FIG. 8 begins at step 802 and flows directly to step 804. The query processor 214, at step 804, extracts query path expressions from a received query. The query processor 214, at step 806, processes each query path expression. Each query path expression, at step 808, is matched against shared hierarchical markup documents. The query processor 214, at step 810, determines if the matching yields a complete match. If the result of this determination is positive, the query processor 214, at step 812, retrieves results using a category ID associated with the documents and the control flows to step 818. If the result of this determination is negative, the query processor 214, at step 814, determines if the matching yields a partial match. If the result of this determination is negative, the query processor 214 selects another query path expression at step 806 and the process of step 808 to step 814 is repeated.

If the result of this determination is positive, the query processor 214, at step 816, retrieves results by processing remaining query path expressions on difference documents with matching category IDs. The query processor 214, at step 818, determines if all of the query path expressions have been processed. If the result of this determination is negative, the control flows back to step 806, where step 808 to step 818 are repeated until all query path expressions have been processed. If the result of this determination is positive, the query processor 214, at step 820 combines the results if necessary. For example, if a complete match was determined at step 810 the combination step is not necessary. However, if a partial match was determined at step 814, the results from the partial matches are combined to form a final result. The control flow then exits at step 822.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer implemented method for managing documents, the method comprising:

analyzing, by a processor at an information processing system, a plurality of hierarchical markup documents, wherein each hierarchical markup document is representable by an unordered hierarchical tree structure and wherein each hierarchical markup document in the plurality of hierarchical markup documents is different from all other hierarchical markup documents in the plurality of hierarchical markup documents;

generating, by the processor at the information processing system, based on analyzing the plurality of hierarchical markup documents, a shared hierarchical markup document associated with the plurality of hierarchical markup documents, wherein the shared hierarchical markup document is a hierarchical markup document generated from at least two hierarchical markup documents in the plurality of hierarchical markup documents and consists only of a single rooted tree that is common to the at least two hierarchical markup documents, wherein generating the shared hierarchical markup document comprises:

identifying a base set of root nodes comprising a first root node associated with at least a first hierarchical markup document in the plurality of hierarchical markup documents and a second root node associated with at least a second hierarchical markup document in the plurality of hierarchical markup documents;

determining if the first root node and the second root node match based on the first and second root nodes comprising a same node type and at least one of a same name for element or attribute nodes and same values for value nodes if the first root node and the second root node fail to match, expanding the base set of root nodes by adding at least one additional root node to the base set of root nodes, and determining if the one additional root node matches any other root nodes in the expanded base set of root nodes, wherein the one additional root node is associated with an additional hierarchical markup document in the plurality of hierarchical markup documents;

in response to any two root nodes matching in the expanded base set of root nodes, recursively identifying all matching child node pairs, wherein a child node pair comprises a child node from a respective hierarchal markup document associated with a first root node in the two root nodes and a matching child node from a respective second hierarchal markup document associated a second root node in the two root nodes, and wherein for each child node that has multiple matches a corresponding number of matched child node pairs are identified;

performing recursively for each matching child node pair that has been identified:
generating a shared hierarchical markup sub-tree for each matching pair of child nodes to create a set of shared hierarchical markup sub-trees;
processing the set of shared hierarchal markup sub-trees, wherein the processing comprises:
selecting a sub-tree from the set of shared hierarchical markup sub-trees with a largest size;
adding the selected sub-tree as a child node to the shared hierarchical markup document;
removing all the sub-trees from the set of shared hierarchical markup sub-trees that correspond to either node of the matching child node pair for which a largest sized sub-tree was generated
to avoid being selected again;
repeating the processing steps until all of the set of shared hierarchal markup sub-trees have been removed;

comparing, by the processor at the information processing system, each hierarchical markup document in the plurality of hierarchical markup documents with the shared hierarchical document; and
generating, by the processor at the information processing system, based on comparing each hierarchical markup document, a plurality of difference hierarchical markup documents, wherein each difference hierarchical markup document in the plurality of difference hierarchical markup documents consists only of a set of differences between a hierarchical markup document in the plurality of hierarchical markup documents and the shared hierarchical markup document.

2. The computer implemented method of claim 1, further comprising:
reconstructing from the shared hierarchical document and at least one difference hierarchical markup document in the plurality of difference hierarchical markup documents at least one hierarchical markup document in the plurality of hierarchical markup documents.

3. The computer implemented method of claim 1, wherein generating the plurality of difference hierarchical markup documents further comprises:
determining, for each of the hierarchical markup documents, differences between the hierarchical markup document and the shared hierarchical markup document; and
generating a sub-tree comprising a node for each determined difference, where the node for each determined difference is associated with a corresponding node in the shared hierarchical markup document.

4. The computer implemented method of claim 3, further comprising:
annotating the node for each determined difference with at least one of a node identifier and a value notation.

5. The computer implemented method of claim 1, further comprising:
annotating at least one node in the shared hierarchical markup document with at least one of a node identifier and a value notation.

6. The computer implemented method of claim 1, further comprising:

annotating at least one node in the shared hierarchical markup document with statistical information including values associated with the node.

7. The computer implemented method of claim 1, wherein the hierarchical markup documents are extensible markup language documents.

8. The computer implemented method of claim 1, wherein the shared hierarchical markup document and the plurality of difference markup documents are extensible markup language documents.

9. The computer implemented method of claim 1, wherein the shared hierarchical markup document is a single connected tree including values common to each of the hierarchical markup documents in the plurality of hierarchical markup documents.

10. An information processing system for managing documents, the information processing system comprising:
a memory;
a processor communicatively coupled to the memory;
a data modeler communicatively coupled to the processor, wherein the data modeler is configured to perform a method comprising:
analyzing a plurality of hierarchical markup documents, wherein each hierarchical markup document is representable by an unordered hierarchical tree structure and wherein each hierarchical markup document in the plurality of hierarchical markup documents is different from all other hierarchical markup documents in the plurality of hierarchical markup documents;
generating, based on the plurality of hierarchical markup documents being analyzed, a shared hierarchical markup document associated with the plurality of hierarchical markup documents, wherein the shared hierarchical markup document is a hierarchical markup document generated from at least two hierarchical markup documents in the plurality of hierarchical markup documents and consists only of a single rooted tree that is common to the at least two hierarchical markup documents, wherein generating the shared hierarchical markup document comprises:
identifying a base set of root nodes comprising a first root node associated with at least a first hierarchical markup document in the plurality of hierarchical markup documents and a second root node associated with at least a second hierarchical markup document in the plurality of hierarchical markup documents;
determining
if the first root node and the second root node match based on the first and second root nodes comprising a same node type and at least one of a same name for element or attribute nodes and same values for value nodes
if the first root node and the second root node fail to match, expanding the base set of root nodes by adding at least one additional root node to the base set of root nodes, and determining if the one additional root node matches any other root nodes in the expanded base set of root nodes, wherein the one additional root node is associated with an additional hierarchical markup document in the plurality of hierarchical markup documents;
in response to any two root nodes matching in the expanded base set of root nodes, recursively identifying all matching child node pairs, wherein a child node pair comprises a child node from a respective hierarchal markup document associated with a first root node in the two root nodes and a matching child node from a respective second hierarchal markup document associated a second root node in the two root nodes, and wherein for each child node that has multiple matches a corresponding number of matched child node pairs are identified;

performing recursively for each matching child node pair that has been identified:
  generating a shared hierarchical markup sub-tree for each matching pair of child nodes to create a set of shared hierarchical markup sub-trees;
  processing the set of shared hierarchal markup sub-trees, wherein the processing comprises:
    selecting a sub-tree from the set of shared hierarchical markup sub-trees with a largest size;
    adding the selected sub-tree as a child node to the shared hierarchical markup document;
    removing all the sub-trees from the set of shared hierarchical markup sub-trees that correspond to either node of the matching child node pair for which a largest sized sub-tree was generated
  to avoid being selected again;
  repeating the processing steps until all of the set of shared hierarchal markup sub-trees have been removed;

comparing each hierarchical markup document in the plurality of hierarchical markup documents with the shared hierarchical document; and generating, based on each hierarchical markup document being compared, a plurality of difference hierarchical markup documents, wherein each difference hierarchical markup document in the plurality of difference hierarchical markup documents consists only of a set of differences between a hierarchical markup document in the plurality of hierarchical markup documents and the shared hierarchical markup document.

11. The information processing system of claim 10, wherein the method further comprises:
  reconstructing, from the shared hierarchical document and at least one difference hierarchical markup document in the plurality of difference hierarchical markup documents, at least one hierarchical markup document in the plurality of hierarchical markup documents.

12. The information processing system of claim 10, wherein generating the plurality of difference hierarchical markup documents further comprises:
  determining, for each of the hierarchical markup documents, differences between the hierarchical markup document and the shared hierarchical markup document; and
  generating a sub-tree comprising a node for each determined difference, where the node for each determined difference is associated with a corresponding node in the shared hierarchical markup document.

13. A non-transitory computer readable medium for managing documents, the computer readable medium comprising instructions for:
  analyzing a plurality of hierarchical markup documents, wherein each hierarchical markup document is representable by an unordered hierarchical tree structure and wherein each hierarchical markup document in the plurality of hierarchical markup documents is different from all other hierarchical markup documents in the plurality of hierarchical markup documents;
  generating, based on analyzing the plurality of hierarchical markup documents, a shared hierarchical markup document associated with the plurality of hierarchical markup documents, wherein the shared hierarchical markup document is a hierarchical markup document generated from at least two hierarchical markup documents in the plurality of hierarchical markup documents and consists only of a single rooted tree that is common to the at least two hierarchical markup documents, wherein generating the shared hierarchical markup document comprises:
  identifying a base set of root nodes comprising a first root node associated with at least a first hierarchical markup document in the plurality of hierarchical markup documents and a second root node associated with at least a second hierarchical markup document in the plurality of hierarchical markup documents;
  determining
    if the first root node and the second root node match based on the first and second root nodes comprising a same node type and at least one of a same name for element or attribute nodes and same values for value nodes
    if the first root node and the second root node fail to match, expanding the base set of root nodes by adding at least one additional root node to the base set of root nodes, and determining if the one additional root node matches any other root nodes in the expanded base set of root nodes, wherein the one additional root node is associated with an additional hierarchical markup document in the plurality of hierarchical markup documents;
  in response to any two root nodes matching in the expanded base set of root nodes, recursively identifying all matching child node pairs, wherein a child node pair comprises a child node from a respective hierarchal markup document associated with a first root node in the two root nodes and a matching child node from a respective second hierarchal markup document associated a second root node in the two root nodes, and wherein for each child node that has multiple matches a corresponding number of matched child node pairs are identified;
  performing recursively for each matching child node pair that has been identified:
    generating a shared hierarchical markup sub-tree for each matching pair of child nodes to create a set of shared hierarchical markup sub-trees;
    processing the set of shared hierarchal markup sub-trees, wherein the processing comprises:
      selecting a sub-tree from the set of shared hierarchical markup sub-trees with a largest size;
      adding the selected sub-tree as a child node to the shared hierarchical markup document;
      removing all the sub-trees from the set of shared hierarchical markup sub-trees that correspond to either node of the matching child node pair for which a largest sized sub-tree was generated
    to avoid being selected again;
    repeating the processing steps until all of the set of shared hierarchal markup sub-trees have been removed;
  comparing each hierarchical markup document in the plurality of hierarchical markup documents with the shared hierarchical document; and
  generating, based on comparing each hierarchical markup document, a plurality of difference hierarchical markup documents, wherein each difference hierarchical markup document in the plurality of difference hierarchical markup documents consists only of a set of differences between a hierarchical markup document in the plurality of hierarchical markup documents and the shared hierarchical markup document.

14. A non-transitory computer readable medium of claim 13, further comprising instructions for:
reconstructing from the shared hierarchical document and at least one difference hierarchical markup document in the plurality of difference hierarchical markup documents at least one hierarchical markup document in the plurality of hierarchical markup documents.

15. A non-transitory computer readable medium of claim 13, wherein the instructions for generating the plurality of difference hierarchical markup documents further comprise instructions for:
determining, for each of the hierarchical markup documents, differences between the hierarchical markup document and the shared hierarchical markup document; and
generating a sub-tree comprising a node for each determined difference, where the node for each determined difference is associated with a corresponding node in the shared hierarchical markup document.

16. A non-transitory computer readable medium of claim 13, further comprising instructions for at least one of:
annotating at least one node in the shared hierarchical markup document with at least one of a node identifier and a value notation; and
annotating at least one node in the shared hierarchical markup document with statistical information including values associated with the node.

* * * * *